(12) United States Patent
Kaplun et al.

(10) Patent No.: US 8,180,815 B2
(45) Date of Patent: *May 15, 2012

(54) REDUNDANCY-FREE CIRCUITS FOR ZERO COUNTERS

(75) Inventors: Aleksandr Kaplun, Whitsett, NC (US); Huajun J. Wen, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 946 days.

This patent is subject to a terminal disclaimer.

(21) Appl. No.: 12/189,794

(22) Filed: Aug. 12, 2008

(65) Prior Publication Data

US 2008/0301209 A1    Dec. 4, 2008

Related U.S. Application Data

(63) Continuation of application No. 11/130,551, filed on May 17, 2005, now Pat. No. 7,461,110.

(51) Int. Cl.
*G06F 15/00* (2006.01)

(52) U.S. Cl. ...................................... 708/211

(58) Field of Classification Search .................. 708/205, 708/211

See application file for complete search history.

(56) References Cited

U.S. PATENT DOCUMENTS

| 5,568,410 | A | 10/1996 | Bechade |
| 5,798,953 | A | 8/1998 | Lozano |
| 5,844,826 | A * | 12/1998 | Nguyen ........................ 708/211 |
| 6,779,008 | B1 | 8/2004 | Erle et al. |
| 7,461,110 | B2 * | 12/2008 | Kaplun et al. ................ 708/211 |

OTHER PUBLICATIONS

E. Hokenek et al., "Leading-zero anticipator (LZA) in the IBM RISC System/6000 Floating Point Execution Unit," IBM J. Res. Develop. v. 34, No. 1, pp. 71-77 (Jan. 1990).

* cited by examiner

*Primary Examiner* — Chuong D Ngo

(74) *Attorney, Agent, or Firm* — Matthew W. Baca; Jack V. Musgrove

(57) ABSTRACT

A more efficient method of counting the number of zeros in a 4-bit value generates three output bits (q0, q1 and q2) from four input bits (a0, a1, a2 and a3) according to the logic equations q0=not(a1+a2+a3+a4), q1=not(a0+a1), q2=a1(not a0)+not(a0+a2). These output bits yield the number of non-significant (leading or trailing) zeros in the 4-bit value. The invention may be implemented in a 16-bit zero counter having four 4-bit decoders, but is applicable to any number of zero counters. The output bits from the four 4-bit decoders can be combined to yield a 5-bit count whose most significant bit is a one when all input bits from all four of the 4-bit blocks are zero. A multiplexer stage derives two outputs based on a portion of the decode bits. For wider counters, the output stage uses four AOI21 gates to merge additional decode bits from a next lower 16-bit zero counter.

18 Claims, 8 Drawing Sheets

REDUNDANCY-FREE CIRCUITS FOR ZERO COUNTERS

CROSS-REFERENCE TO RELATED APPLICATION

This application is a continuation of U.S. patent application Ser. No. 11/130,551 filed May 17, 2005, now U.S. Pat. No. 7,461,110.

BACKGROUND OF THE INVENTION

1. Field of the Invention

The present invention generally relates to data processing systems, and more particularly to a method of counting leading or trailing zeros in an arithmetic logic unit such as an execution unit of a microprocessor.

2. Description of the Related Art

The most important element of a computer system is generally the microprocessor which performs logical and arithmetic operations on different types of numbers, or operands. The simplest operations involve integer operands, which are represented using a fixed-point notation. Non-integers are typically represented according to a floating-point notation. Standard number 754 of the Institute of Electrical and Electronics Engineers (IEEE) sets forth particular formats which are used in most modern computers for floating-point operations. For example, a single-precision floating-point number is represented using a 32-bit (one word) field, and a double-precision floating-point number is represented using a 64-bit (two-word) field. Most processors handle floating-point operations with a floating-point unit (FPU).

Floating-point notation (also referred to as exponential notation), can be used to represent both very large and very small numbers. A floating-point notation has three parts, a mantissa (or significand), an exponent, and a sign (positive or negative). The mantissa specifies the digits of the number, and the exponent specifies the magnitude of the number, i.e., the power of the base which is to be multiplied with the mantissa to generate the number. For example, using base 10, the number 28330000 would be represented as 2833E+4, and the number 0.054565 would be represented as 54565E-6. Since processors use binary values, floating-point numbers in computers use 2 as a base (radix). Thus, a floating-point number may generally be expressed in binary terms according to the form $$n = (-1)^S \times 1.F \times 2^E,$$

where n is the floating-point number (in base 10), S is the sign of the number (0 for positive or 1 for negative), F is the fractional component of the mantissa (in base 2), and E is the exponent of the radix. In accordance with IEEE standard 754, a single-precision floating-point number uses the 32 bits as follows: the first bit indicates the sign (S), the next eight bits indicate the exponent offset by a bias amount of 127 (E+bias), and the last 23 bits indicate the fraction (F). So, for example, the decimal number ten would be represented by the 32-bit value 0 10000010 01000000000000000000000 as this corresponds to $(-1)^0 \times 1.01_2 \times 2^{130-127} = 1.25 \times 2^3 = 10$.

When a value is expressed in accordance with the foregoing convention, it is said to be normalized, that is, the leading bit in the significand is nonzero, or a "1" in the case of a binary value (as in "1.F"). If the explicit or implicit most significant bit is zero (as in "0.F"), then the number is said to be unnormalized. Unnormalized numbers can easily occur as an output result of a floating-point operation, such as the effective subtraction of one number from another number that is only slightly different in value. The fraction is shifted left (leading zeros are removed from the fraction) and the exponent adjusted accordingly; if the exponent is greater than or equal to $E_{mim}$ (the minimum exponent value), then the result is said to be normalized. If the exponent is less than $E_{min}$, an underflow has occurred. If the underflow is disabled, the fraction is shifted right (zeros inserted) until the exponent is equal to $E_{min}$. The exponent is replaced with "000" (hexadecimal), and the result is said to be denormalized. For example, two numbers (having the same small exponent E) may have mantissas of 1.010101 and 1.010010, and when the latter number is subtracted from the former, the result is 0.000011, an unnormalized number. If E<5, the final result will be a denormalized number.

The hardware of many conventional computers is adapted to process only normalized numbers. Therefore, when a denormalized number is presented as an output result of a floating-point operation, it must be normalized before further processing of the number can take place. Various techniques are used to normalize the values, generally by removing leading zeros from the fraction and accordingly decrementing the exponent. One technique involves leading zero anticipator (LZA) logic which predicts the number of zeros to remove before the floating-point arithmetic is completed. See IBM Journal of Research and Development, vol. 34, no. 1 (January 1990), pp. 71-77. In addition to normalizing denormalized results, i.e., removing leading zeros caused by the effective subtract operation, it is sometimes necessary to prenormalize input values, i.e., remove leading zeros from the source operands (A, B, and C). Prenormalization is usually required if A, B, or C is a denormalized number (a denormalized input number is changed to a number with an implicit bit equal to 1 and an exponent less than $E_{min}$).

With reference to FIG. 1, there is illustrated a high-level block diagram of a typical floating-point execution unit 10 for handling floating-point operations. Floating-point execution unit 10 includes three inputs 12, 14, and 16 for receiving input operands A, B, and C, respectively, expressed as binary floating-point numbers. Floating-point execution unit 10 uses these operands to perform a multiply-add instruction. The multiply-add instruction executes the arithmetic operation ±[(A×C)±B]. The exponent portions of operands A, B, and C received at inputs 12, 14, and 16 are provided to an exponent calculator 18. The mantissa portions of operands A and C are provided to a multiplier 20, while the mantissa portion of operand B is provided to an alignment shifter 22. As used herein, the term "adding" inherently includes subtraction since the B operand can be a negative number.

As explained above, multiplier 20 receives the mantissas of operands A and C and calculates the sum and carry results. These intermediate results are provided to a main adder/incrementer 24. Exponent calculator 18 calculates an intermediate exponent from the sum of the exponents of operands A and C and stores the intermediate exponent in an intermediate exponent register 26. Exponent calculator 18 also calculates the difference between the intermediate exponent and the exponent of operand B, and decodes that value to provide control signals to both a leading zero anticipator (LZA) 28 and alignment shifter 22. Alignment shifter 22 shifts the mantissa of operand B so that the exponent of operand B, adjusted to correspond to the shifted mantissa, equals the intermediate exponent. The shifted mantissa of operand B is then provided to main adder/incrementer 24. Main adder/incrementer 24 adds the shifted mantissa of operand B to the sum and carry results of multiplier 20. The output of main adder/incrementer 24 is stored in an intermediate result register 30.

Simultaneously with the mantissa addition in main adder/incrementer 24, LZA 28 predicts the position of the leading one in the result. LZA 28 computes a normalize adjust based on the minimum bit position, which is stored in a normalize adjust register 32. The normalize adjust from normalize adjust register 32 is provided, together with the intermediate result mantissa from intermediate result register 30, to a normalizer 34. Normalizer 34 performs the shifting required to place the leading one in the most significant bit position of the result mantissa. The shifted mantissa is then provided to a rounder 36, which rounds-off the result mantissa to the appropriate number of bits.

The normalize adjust from normalize adjust register 32 is also provided to an exponent adder 38. To obtain the proper exponent, the exponent is initially adjusted to correct for the maximum shift predicted by leading zero anticipator 28. If the final result of main adder/incrementer 24 requires only the minimum shift, a late "carry-in" to the exponent adder corrects for the minimum shift amount. To adjust the exponent for the maximum shift predicted, the two's complement of the maximum bit position is added to the intermediate exponent. The addition of the exponent adjust to the intermediate exponent may be initiated as soon as the exponent adjust is available from leading zero anticipator 28, which will typically be before the result from main adder/incrementer 24 becomes available. The final result mantissa from rounder 36 is combined with the final exponent from exponent adder 38 and forwarded at output 40, to a result bus of floating-point execution unit 10. When used as a component of a microprocessor, the floating-point result may be directly written to a floating-point register or to a designated entry in a rename buffer.

As microelectronic technology progresses, it becomes increasingly important to ensure that circuits are efficient with regard to physical size (chip area), speed, and power consumption. Many digital devices have components with redundant features that impart no added functionality, and make the component less efficient. In particular, redundancy in zero counters (leading zeros or trailing zeros) such as those used in LZA 28 has traditionally been considered unavoidable, and zero counter circuits with high redundancy have been used in generations of microprocessors. Additionally, redundant devices are generally not testable for stuck faults and, consequently, logic with high redundancy often exhibits low test coverage.

An example of a conventional 16-bit leading zero counter is illustrated in FIGS. 2-4. Four of the input bits (a0, a1, a2, a3) are examined as a base, and three output bits (q0, q1, q2) are used to describe the number of leading zeros in the base 4-bit structure. For this 16-bit counter (or wider counters), the number of leading zeros is equal to the number of zeros from the first 4-bit block that was not all zeros plus that block number (0, 1, 2, . . . ) shifted by 4. The 16-bit counter can thus be implemented as four 4-bit decoders followed by a 4-way multiplexer which adds the block number with a proper shift. Five bits can be used to describe the results of a 16-bit counter, according to the following pseudo-code:

```
lzc16(0:4) =   "00000" when data_in(0) = "1" else
               "00001" when data_in(0:1) = "01" else
               "00010" when data_in(0:2) = "001" else
               "00011" when data_in(0:3) = "0001" else
               "00100" when data_in(0:4) = "00001" else
```

-continued

```
"00101" when data_in(0:5) = "000001" else
"00110" when data_in(0:6) = "0000001" else
"00111" when data_in(0:7) = "00000001" else
"01000" when data_in(0:8) = "000000001" else
"01001" when data_in(0:9) = "0000000001" else
"01010" when data_in(0:10) = "00000000001" else
"01011" when data_in(0:11) = "000000000001" else
"01100" when data_in(0:12) = "0000000000001" else
"01101" when data_in(0:13) = "00000000000001" else
"01110" when data_in(0:14) = "000000000000001" else
"01111" when data_in(0:15) = "0000000000000001" else
"01111" when data_in(0:15) = "0000000000000000".
```

The implementation can be extended to more than 16-bits as required by the processor architecture.

For a 4-bit decoder this logic may be implemented from the Karnaugh map shown in Table 1.

TABLE 1

| a0 | a1 | a2 | a3 | q0 | q1 | q2 |
|----|----|----|----|----|----|----|
| 0  | 0  | 0  | 0  | 1  | 0  | 0  |
| 0  | 0  | 0  | 1  | 0  | 1  | 1  |
| 0  | 0  | 1  | —  | 0  | 1  | 0  |
| 0  | 1  | —  | —  | 0  | 0  | 1  |
| 1  | —  | —  | —  | 0  | 0  | 0  |

This map corresponds to the logic equations:

$$q2 = a1(\text{not } a0) + (\text{not } a0)(\text{not } a2)a3$$

$$q1 = (\text{not}(a0+a1))(a2+a3)$$

$$q0 = \text{not}(a0+a1+a2+a3).$$

The circuit implementation for Table 1 and these equations is shown in FIG. 2A. Inputs a0, a1, a2 and a3 are inverted to create there complements a0_n, a1_n, a2_n and a3_n. For q0_n (the complement of q0), bits a0_n and a1_n are input to a NAND gate 42, and bits a2_n and a3_n are input to another NAND gate 44. The outputs of NAND gates 42 and 44 are connected to respective inverters 46 and 48 which feed the inputs of another NAND gate 50. The output of NAND gate 50 is bit q0_n. For q1, bits a0_n, a1_n and a2 are input to a NAND gate 52, and bits a0_n, a1_n and a3 are input to another NAND gate 54. The outputs of NAND gates 52 and 54 feed the inputs of another NAND gate 56. The output of NAND gate 56 is bit q1. For q2, bits a0_n, a2_n and a3 are input to a NAND gate 58, and bits a0_n and a1 are input to another NAND gate 60. The outputs of NAND gates 58 and 60 feed the inputs of another NAND gate 62. The output of NAND gate 62 is bit q2.

FIG. 2B implements the same function as described in Table 1 but uses inputs a0, a1, a2 and a3 to create q0_n. A first NOR 43 gate receives inputs a0 and a1, and a second NOR gate 45 receives inputs a2 and a3. The outputs of the NOR gates are combined in a NAND gate 51.

FIG. 3 shows the 16-bit counter 64 with five output bits lzc16f(0:4). The data bus 66 transmits the sixteen bits to four 4-bit decoders 68a, 68b, 68c, 68d. Each of these decoders is identical (using the circuitry of FIG. 2A), and they generate a total of twelve decode bits q0_n, q1, . . . , q11. The outputs of the decoders are connected to a multiplexer 70, and to another 4-bit decoder 68e which uses the implementation of FIG. 2B. Multiplexer 70 derives two outputs based on eleven of the outputs from the 4-bit decoders. An existing design for multiplexer 70 is seen in FIG. 4. Decode bits q0_n, q3_n and q6_n are used to create eight control signals. Decode bit q0_n and its complement correspond to control signals lowmux_0 and lowmux_0f. Decode bit q3_n and the complement of decode bit q0_n are input to a NAND gate 76 whose output and complement become control signals lowmux_1f and lowmux_1. Decode bit q6_n and the complements of decode bits q0_n and q3_n are input to another NAND gate 78 whose output and complement become control signals lowmux_2f and lowmux_2. The complements of all three decode bits q0_n, q3_n, q6_n are input to another NAND gate 80 whose output and complement become control signals lowmux_3f and lowmux_3. These four pairs of signals respectively control four sets of NFET/PFET gates 82, 84, 86, 88. Each NFET/PFET gate has an n-type field-effect transistor coupled to a p-type field-effect transistor to selectively pass or block a decode bit. NFET/PFET gate 82 passes decode bit q1; NFET/PFET gate 84 passes decode bit q4; NFET/PFET gate 86 passes decode bit q7; and NFET/PFET gate 88 passes decode bit q10. The outputs of these gates are connected to an inverter whose output is muxout1f. The control signals similarly select between four other NFET/PFET gates 90, 92, 94, 96. NFET/PFET gate 90 passes decode bit q2; NFET/PFET gate 92 passes decode bit q5; NFET/PFET gate 94 passes decode bit q8; and NFET/PFET gate 96 passes decode bit q11. The outputs of these gates are connected to an inverter whose output is muxout2f.

Returning to FIG. 3, the outputs of decoder 68e and multiplexer 70 are input to four 2:1 multiplexers 72a, 72b, 72c, 72d. This last multiplexer stage can enable a counter wider than 16 bits. Each multiplexer 72a, 72b, 72c, 72d is controlled by the first (q0_n) output of decoder 68e and its complement, and each multiplexer receives one bit from the next lower 16-bit counter via bus 74. The other input to multiplexer 72a is the complement of the second (q1) output of decoder 68e; the other input to multiplexer 72b is the complement of the third (q2) output of decoder 68e; the other input to multiplexer 72c is muxout1f from multiplexer 70; the other input to multiplexer 72a is muxout2f from multiplexer 70. The combined outputs from multiplexers 72a, 72b, 72c, 72d become bits lzc16f(1:4). Output bit lzc16f(0) is the first (q0_n) output of decoder 68e. When all 16 bits (a0, a1, ..., a15) are zero, then lzc16f(0)=0 and the values from bus 74 are selected. Otherwise, outputs from multiplexer 70 and decoder 68e are selected.

This zero counter design has been used in many generations of processors. However, analysis of the design indicates it may still have a redundancy rate as high as 6.6%, making this circuitry not only harder to test, but also slower and more power consumptive. It would, therefore, be desirable to devise an improved zero counter circuit with less redundancy that could lead to greater overall performance. It would be further advantageous if the improved zero counter could make more efficient use of chip area and power.

SUMMARY OF THE INVENTION

It is therefore one object of the present invention to provide an improved zero counter circuit.

It is another object of the present invention to provide a zero counter circuit with little or no redundancy, to make more efficient use of chip area and power.

It is yet another object of the present invention to provide a zero counter circuit that can operate at a higher speed.

The foregoing objects are achieved in a method of counting the number of leading zeros in a 4-bit value, by generating three output bits (q0, q1 and q2) from four input bits (a0, a1, a2 and a3) according to the logic equations q0=not(a1+a2+a3+a4), q1=not(a0+a1), q2=a1(not a0)+not(a0+a2). These output bits are combined to yield the number of non-significant zeros in the 4-bit value. When the output bit q0 is used as the most significant bit and the output bit q2 is used as the least significant bit, the output bits indicate the number of leading zeros. In one embodiment (FIG. 5A), the method is carried out by transmitting four input bits a0_n, a1_n, a2_n and a3 to respective inputs of a first NAND gate whose output is bit q0_n, transmitting input bits a0_n and a1_n to respective inputs of a second NAND gate whose output is the complement of bit q1, transmitting input bits a0_n and a2_n to respective inputs of a third NAND gate, and transmitting input bits a0_n and a1 to a fourth NAND gate, wherein outputs of the third and fourth NAND gates are connected to respective inputs of a fifth NAND gate whose output is bit q2. In an alternative embodiment (FIG. 5B), the method is carried out by transmitting input bits a0 and a1 to respective inputs of a first NOR gate whose output is bit q1, transmitting input bits a2 and a3 to respective inputs of a second NOR gate, wherein outputs of the first and second NOR gates are connected to respective inputs of a first NAND gate whose output is bit q0_n, transmitting input bits a0 and a2 to respective inputs of a second NAND gate, and transmitting input bits a0 and a1 to a third NAND gate, wherein outputs of the second and third NAND gates are connected to respective inputs of a fourth NAND gate whose output is bit q2.

The invention may be implemented in a 16-bit zero counter having four 4-bit decoders for each of the 4-bit data blocks. The output bits from the four 4-bit decoders can be combined to yield a 5-bit count whose most significant bit is a one when all input bits from all four of the 4-bit blocks are zero. A multiplexer stage derives two outputs based on a portion of the decode bits. For even wider counters, the output stage preferably uses four AOI21 gates to merge additional decode bits from a next lower 16-bit zero counter, e.g., to enable a 32-bit zero counter.

The above as well as additional objectives, features, and advantages of the present invention will become apparent in the following detailed written description.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

The present invention is directed to a zero counter which may be used in various execution units of a microprocessor, such as a floating-point unit, to predict the number of non-significant zeros (leading or trailing) in a result. The decoding method described herein removes the redundancy in the prior art zero counter logic using a novel Karnaugh map for a 4-bit base. The present invention takes advantage of the fact that, for the situation wherein all four of the base inputs (a0, a1, a2, a3) are zero, two of the output bits (q1 and q2) can be indeterminate since they will not be selected by the final multiplexer stage. In other words, when q0 is "1", the base has four zeros regardless of the values for q1 and q2. A simplified Karnaugh map (and thus simplified circuits) may be used to completely achieve the necessary functionality. The Karnaugh map of Table 2 is similar to the prior art map of Table 1 except for the values of q1 and q2 for all zero inputs.

TABLE 2

| a0 | a1 | a2 | a3 | q0 | q1 | q2 |
|----|----|----|----|----|----|----|
| 0  | 0  | 0  | 0  | 1  | —  | —  |
| 0  | 0  | 0  | 1  | 0  | 1  | 1  |
| 0  | 0  | 1  | —  | 0  | 1  | 0  |
| 0  | 1  | —  | —  | 0  | 0  | 1  |
| 1  | —  | —  | —  | 0  | 0  | 0  |

This map leads to the following logic equations:

$$q2 = a1(\text{not } a0) + \text{not}(a0+a2)$$

$$q1 = \text{not}(a0+a1)$$

$$q0 = \text{not}(a1+a2+a3+a4).$$

Figure 5A:
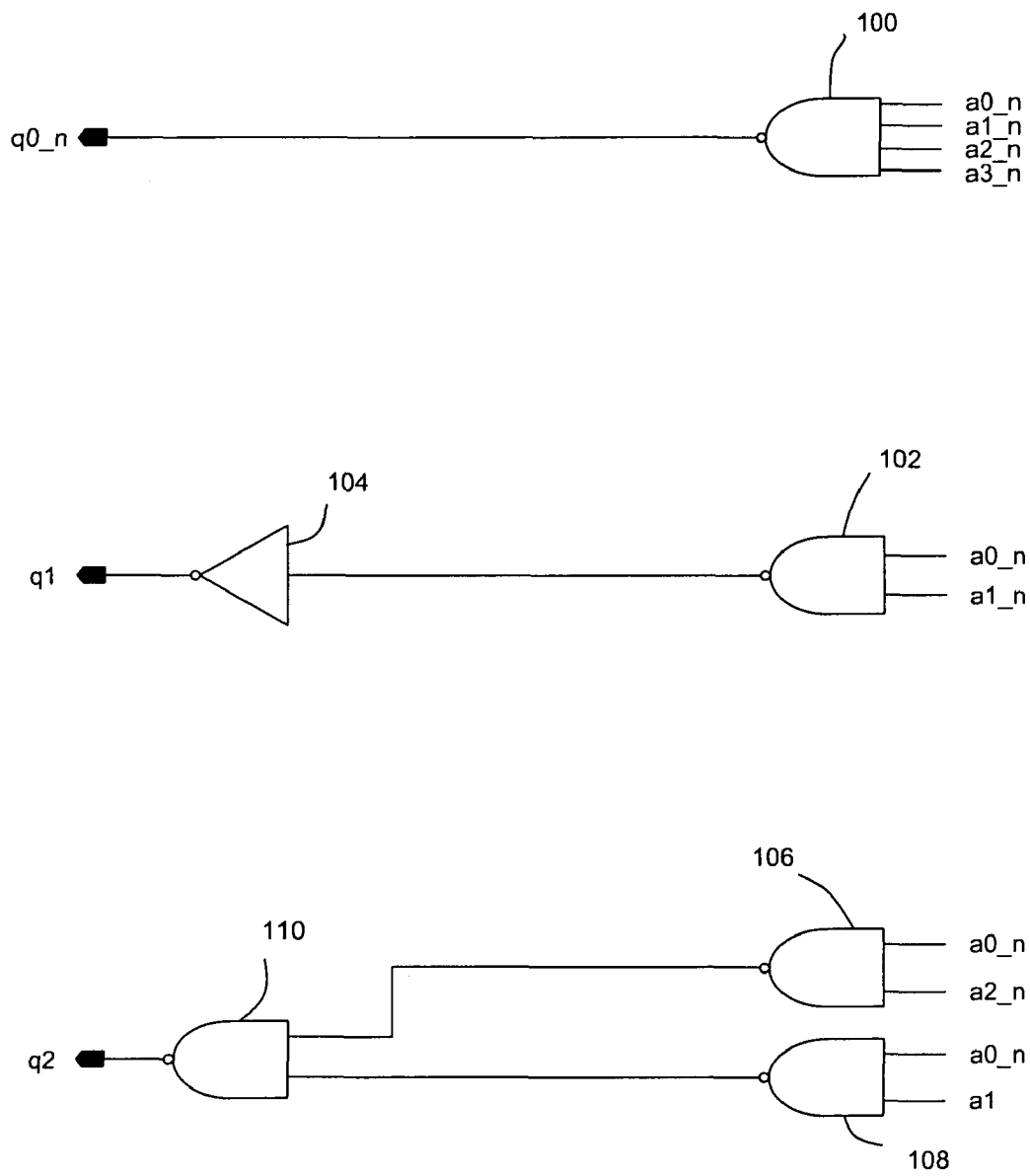
FIG. 5A is a schematic diagram of one embodiment of a 4-bit decoder for a zero counter constructed in accordance with the present invention.
Figure 5B:
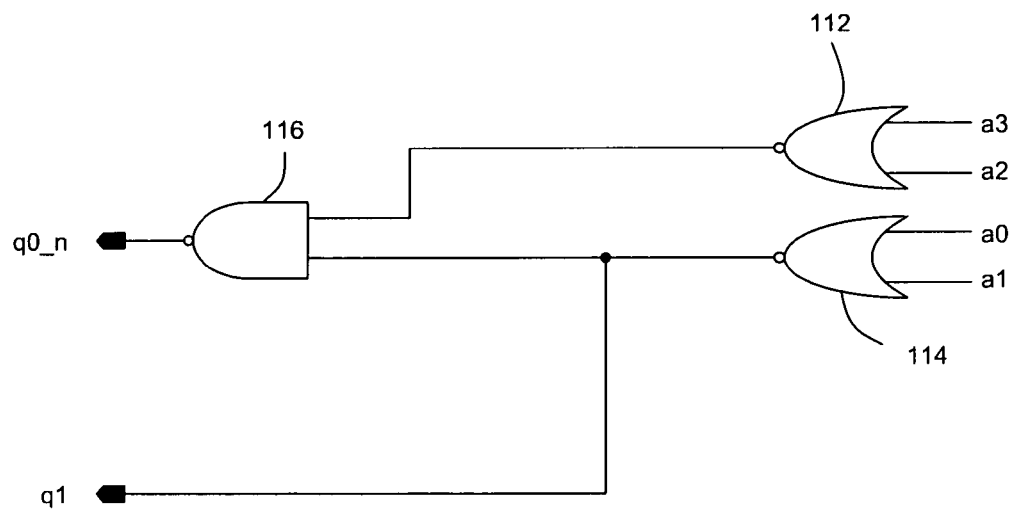
FIG. 5B is a schematic diagram of an alternative embodiment of a 4-bit decoder for a zero counter constructed in accordance with the present invention.
Figure 5B:
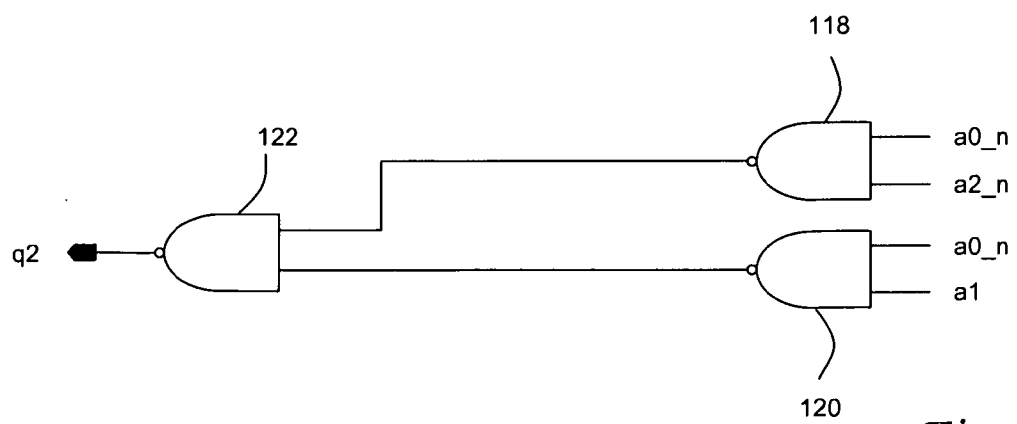

One circuit implementation for Table 2 and these equations is illustrated in FIG. 5. For q0, all four inverted input bits a0_n, a1_n, a2_n and a3_n are input to a NAND gate 100. The output of NAND gate 100 is bit q0_n. For q1, bits a0_n and a1_n are input to another NAND gate 102. The output of NAND gate 102 is connected to an inverter 104. The output of inverter 104 is bit q1. For q2, bits a0_n and a2_n are input to a NAND gate 106, and bits a0_n and a1 are input to another NAND gate 108. The outputs of NAND gates 106 and 108 are connected to another NAND gate 110. The output of NAND gate 110 is bit q2. The output bits q0, q1 and q2 are combined (q0 being most significant and q2 being the least significant) to yield a 3-bit value that is the number of leading zeros in the base.

An alternative implementation for Table 2 is shown in FIG. 5B, adapted for use in a 16-bit counter. For the first decode bit q0_n, base bits a2 and a3 are input to a NOR gate 112, and base bits a0 and a1 are input to another NOR gate 114. The outputs of NOR gates 112 and 114 are connected to a NAND gate 116. The output of NAND gate 116 is decode bit q0_n. The output of NOR gate 114 is also decode bit q1. For the last decode bit q2, base bits a0_n and a2_n are input to a NAND gate 118, and base bits a0_n and a1 are input to another NAND gate 120. The outputs of NAND gates 118 and 120 are connected to another NAND gate 122. The output of NAND gate 122 is decode bit q2.

Figure 6:
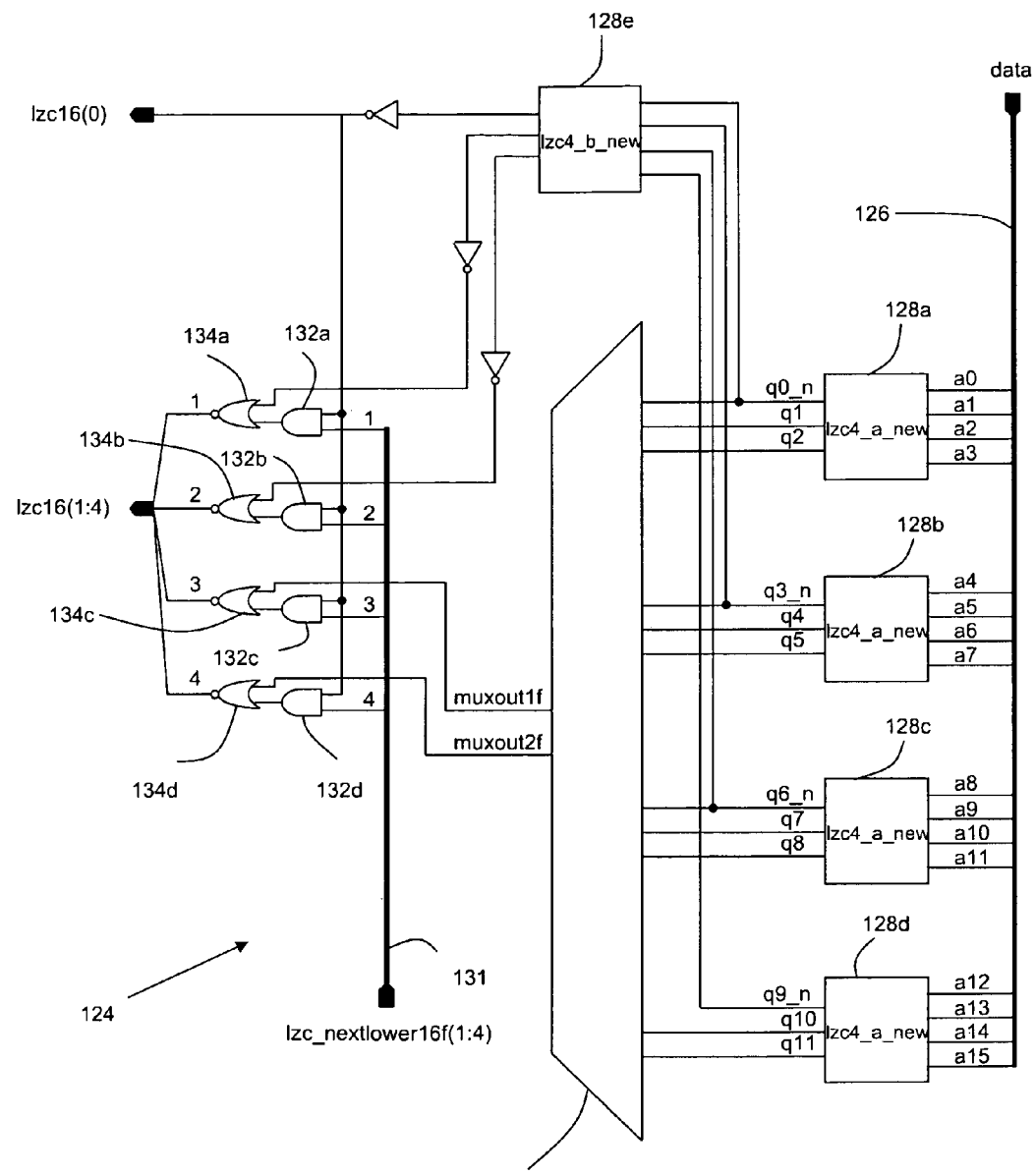
FIG. 6 is a schematic diagram of one embodiment of a 16-bit counter constructed in accordance with the present invention.

One embodiment of the 16-bit counter 124 is shown in FIG. 6, and has five output bits lzc16(0:4). A data bus 126 transmits the sixteen bits to four 4-bit decoders 128a, 128b, 128c, 128d. Each of these decoders is identical (using the circuitry of FIG. 5A), and they generate a total of twelve decode bits q0_n, q1, q2, q3_n, q4, q5, q6_n, q7, q8, q9_n, q10, q11. The outputs of the decoders are connected to a multiplexer 130, and to another 4-bit decoder 128e (which uses the circuitry of FIG. 5B). Multiplexer 130 derives two outputs based on eleven of the outputs from the 4-bit decoders similar to the prior art multiplexer 70 of FIG. 3.

The last multiplexer (output) stage is reduced to four "AOI21" gates to remove the redundant logic in the data and select paths, and merge additional decode bits from a next lower 16-bit counter. An AOI21 gate is and-or-invert CMOS logic having a two-input AND gate and a separate input which feed into a two-input NOR gate. The AOI21 gates thus are used to implement a 32-bit zero counter, and include four AND gates 132a, 132b, 132c, 132d, and four NOR gates 134a, 134b, 134c, 134d. Each AND gate 132a, 132b, 132c, 132d receives one bit from the next lower 16-bit counter via bus 131. The other input to each AND gate is the complement of the first (q0_n) output of decoder 128e. The output of each AND gate is connected to a respective NOR gate 134a, 134b, 134c, 134d. The other input to NOR gate 134a is the complement of the second (q1) output of decoder 128e; the other input to NOR gate 134b is the complement of the third (q2) output of decoder 128e; the other input to NOR gate 134c is muxout1f from multiplexer 130; the other input to NOR gate 134d is muxout2f from multiplexer 130. The combined outputs from NOR gates 134a, 134b, 134c, and 134d become bits lzc16(1:4). Output bit lzc16(0) is the complement of the first (q0_n) output of decoder 128e. The "lzc_nextlower16" bits from bus 131 are of lower significance. Values from multiplexer 130 and decoder 1283 are selected only when lzc16(0)=0. The results of lzc16(0:4) represent leading zeros in a 16-bit number according to the pseudo-code given in the Background section. If lzc16(0)=1, then bus 131 is selected to enable a counter that is longer than 16 bits.

Figure 1:
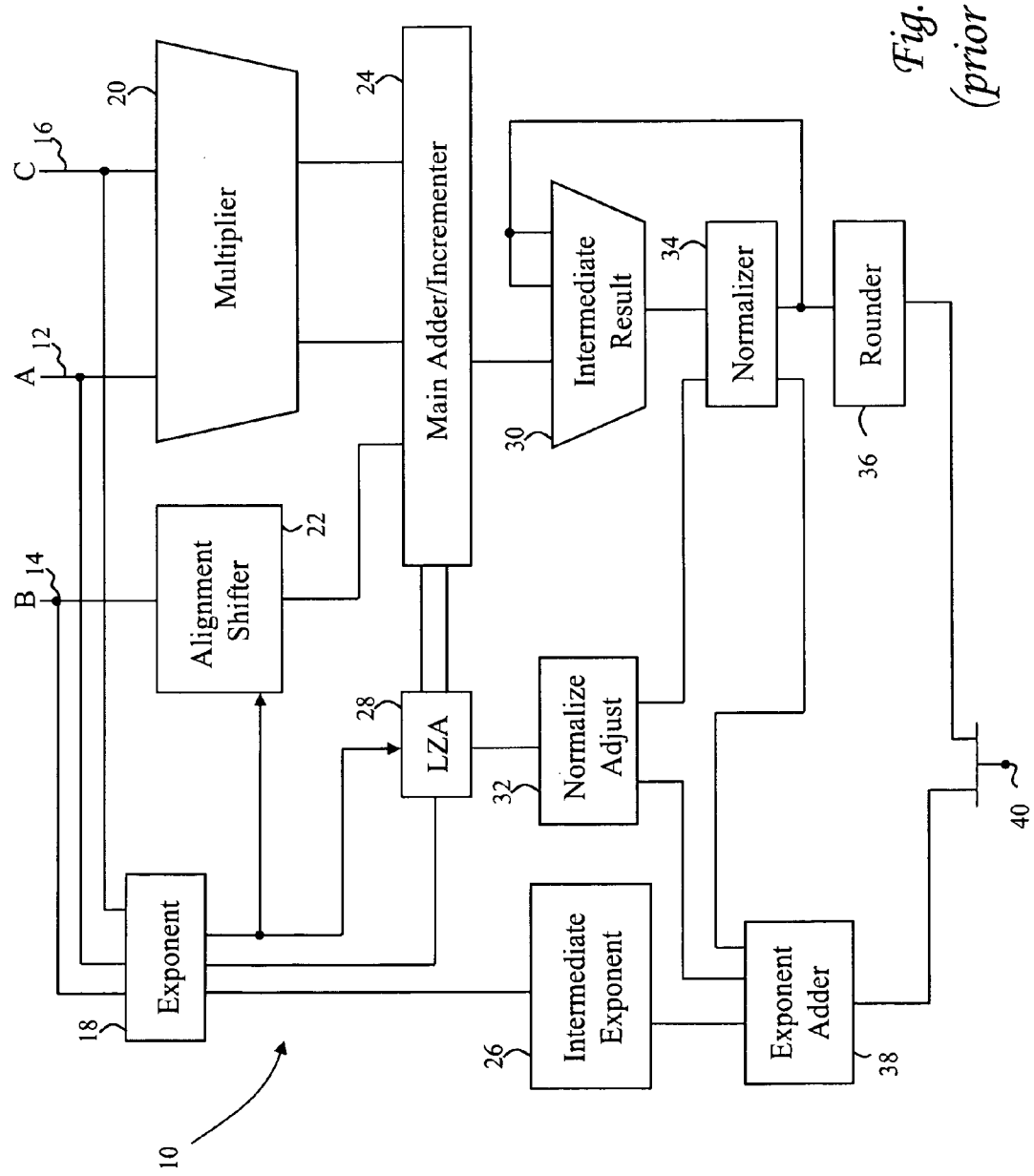
FIG. 1 is a block diagram depicting a conventional floating-point unit of a microprocessor which includes leading zero anticipation logic.
Figure 2A:
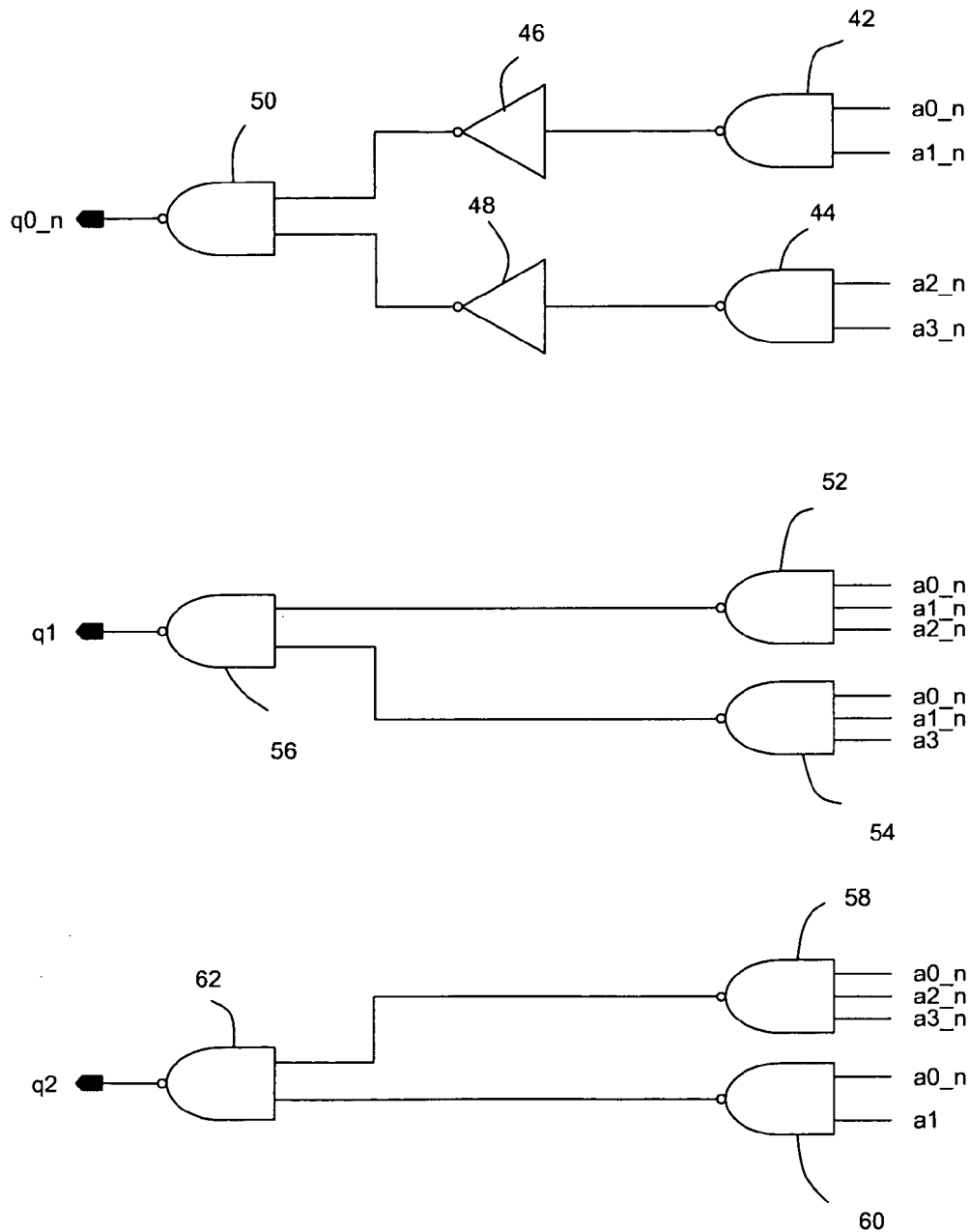
FIG. 2A is a schematic diagram illustrating how zero counter decode bits (q0, q1, q2) are generated in a conventional 4-bit decoder.
Figure 2B:
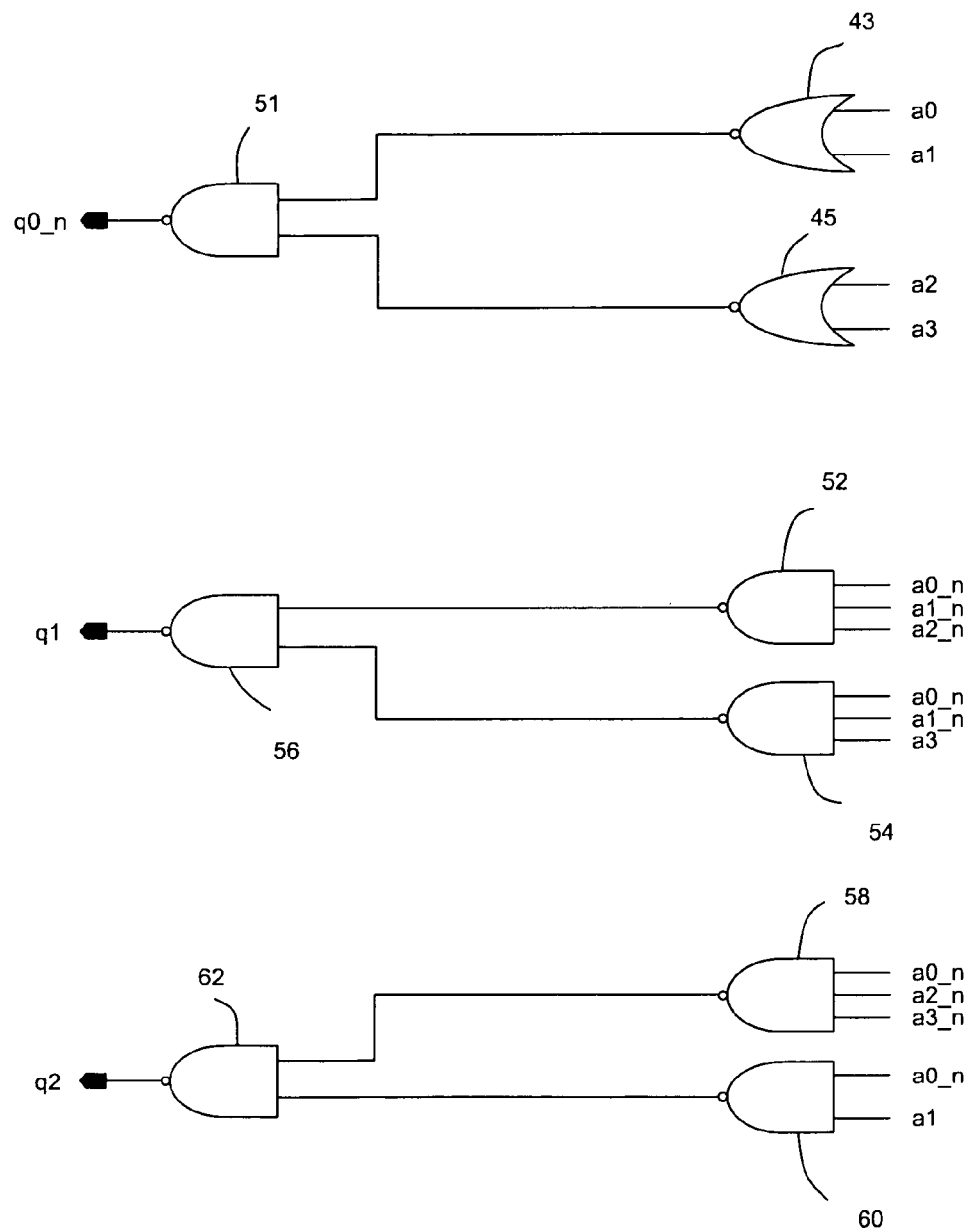
FIG. 2B is a schematic diagram similar to FIG. 2A but using non-inverted inputs to generate decode bit q0_n.
Figure 3:
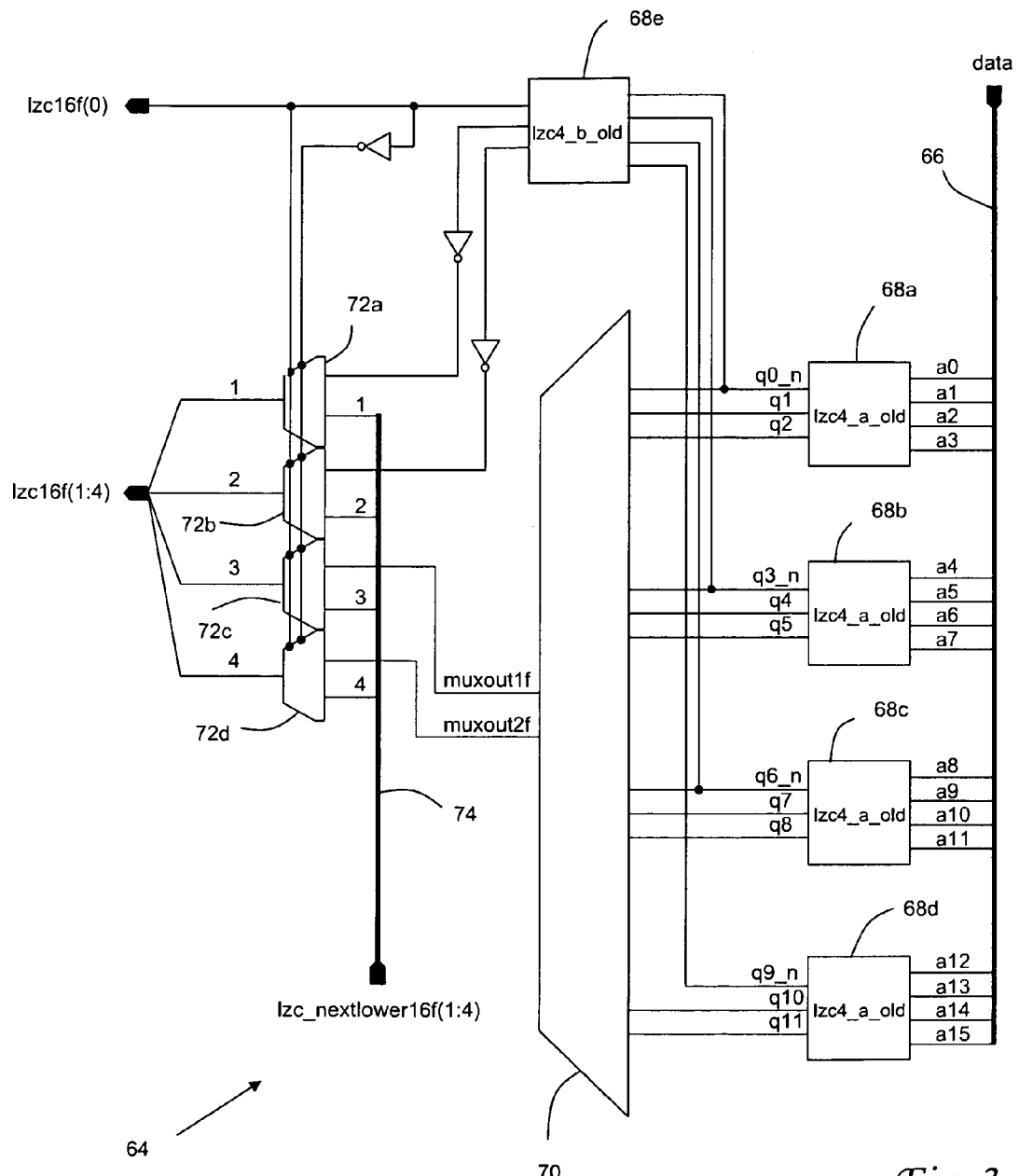
FIG. 3 is a schematic diagram of a conventional 16-bit counter which uses 4-bit decoders constructed in accordance with FIG. 2.
Figure 4:
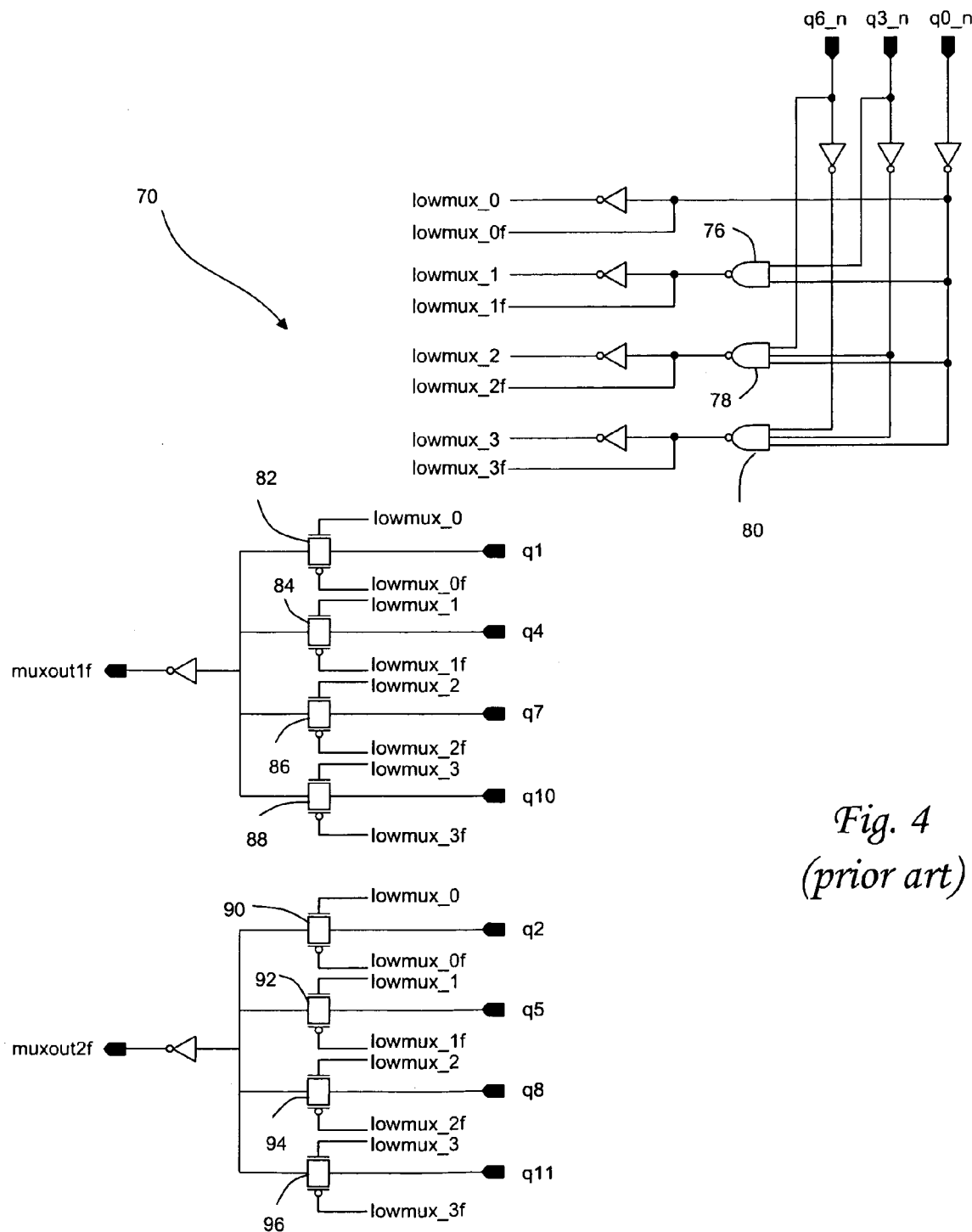
FIG. 4 is a schematic diagram showing the details of a conventional multiplexer design for the 16-bit counter of FIG. 3.

The foregoing implementation is free of redundancy, and modeling indicates that it leads to significant improvements in speed and power/area reduction compared to the prior art implementation of FIGS. 2-4.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, while the zero counter has been discussed in the context of a floating-point unit, other arithmetic logic units can be similarly constructed, such as a fixed-point unit, and the invention may be implemented in other components of special-purpose digital systems where a general-purpose computer would be superfluous. It is therefore contemplated that such modifications can be made without departing from the spirit or scope of the present invention as defined in the appended claims.

What is claimed is:

1. An efficient method of counting the number of zeros in a 4-bit value for reducing circuit redundancy, the method comprising:

generating three output bits q0, q1 and q2 from four input bits a0, a1, a2 and a3 using digital circuitry, wherein the digital circuitry includes a plurality of logic gates to carry out the logic equations $q0=\text{not}(a1+a2+a3+a4),$ $q1=\text{not}(a0+a1),$ $q2=a1(\text{not } a0)+\text{not}(a0+a2);$ and combining the output bits using multiplexer circuitry to yield the number of non-significant zeros in the 4-bit value.

2. The method of claim 1 wherein said combining uses output bit q0 as the most significant bit and uses output bit q2 as the least significant bit to yield the number of leading zeros in the 4-bit value.

3. The method of claim 1 wherein said generating includes:
inverting the input bits to create complementary bits a0_n, a1_n, a2_n, and a3_n;
transmitting bits a0_n, a1_n, a2_n and a3_n to respective inputs of a first NAND gate whose output is the complement of bit q0;
transmitting bits a0_n and a1_n to respective inputs of a second NAND gate whose output is the complement of bit q1; and
transmitting bits a0_n and a2_n to respective inputs of a third NAND gate, and transmitting input bits a0_n and a1 to respective inputs of a fourth NAND gate, wherein outputs of the third and fourth NAND gates are connected to respective inputs of a fifth NAND gate whose output is bit q2.

4. The method of claim 1 wherein said generating includes:
inverting the input bits to create complementary bits a0_n, and a2_n;
transmitting bits a0 and a1 to respective inputs of a first NOR gate whose output is bit q1;
transmitting bits a2 and a3 to respective inputs of a second NOR gate, wherein outputs of the first and second NOR gates are connected to respective inputs of a first NAND gate whose output is the complement of bit q0; and
transmitting bits a0_n and a2_n to respective inputs of a second NAND gate, and transmitting input bits a0_n and a1 to respective inputs of a third NAND gate, wherein outputs of the second and third NAND gates are connected to respective inputs of a fourth NAND gate whose output is bit q2.

5. The method of claim 1 wherein the 4-bit value is one of a plurality of 4-bit blocks of a larger value, and further comprising:
generating one or more additional sets of output bits from respective input bits of the 4-bit blocks based on the same logic equations; and
combining the output bits from all of the 4-bit blocks to yield the number of non-significant zeros in the larger value.

6. The method of claim 5 wherein there are four 4-bit blocks whose output bits are combined to yield the number of non-significant zeros in a 16-bit value.

7. The method of claim 6 wherein the output bits from the four 4-bit blocks are combined to yield a 5-bit count whose most significant bit is a one when all input bits from all four of the 4-bit blocks are zero.

8. A circuit for a zero counter comprising:
four circuit inputs for four respective data bits a0, a1, a2 and a3 of a 4-bit value;
three circuit outputs for three respective decode bits q0, q1 and q2; and
a digital logic circuit which receives said circuit inputs and generates the decode bits at the circuit outputs according to the logic equations $q0=\text{not}(a1+a2+a3+a4),$ $q1=\text{not}(a0+a1),$ $q2=a1(\text{not } a0)+\text{not}(a0+a2).$ 9. The circuit of claim 8 wherein decode bit q0 is a most significant bit and decode bit q2 is a least significant bit, and the decode bits indicate the number of leading zeros in the 4-bit value.

10. The circuit of claim 8 wherein the digital logic includes:
inverters to create complementary bits a0_n, a1_n, a2_n, and a3_n;
a first NAND gate whose inputs receive data bits a0_n, a1_n, a2_n and a3_n, and whose output is the complement of decode bit q0;
a second NAND gate whose inputs receive data bits a0_n and a1_n, and whose output is the complement of decode bit q1;
a third NAND gate whose inputs receive data bits a0_n and a2_n;
a fourth NAND gate whose inputs receive data bits a0_n and a1; and
a fifth NAND gate whose inputs receive outputs of said third and fourth NAND gates, and whose output is decode bit q2.

11. The circuit of claim 8 wherein the digital logic includes:
inverters to create complementary bits a0_n and a2_n;
a first NOR gate whose inputs receive data bits a0 and a1, and whose output is decode bit q1;
a second NOR gate whose inputs receive data bits a2 and a3;
a first NAND gate whose inputs receive outputs of said first and second NOR gates, and whose output is the complement of decode bit q0;
a second NAND gate whose inputs receive data bits a0_n and a2_n;
a third NAND gate whose inputs receive data bits a0_n and a1; and
a fourth NAND gate whose inputs receive outputs of said second and third NAND gates and whose output is data bit q2.

12. A zero counter comprising:
a plurality of 4-bit decoders, each 4-bit decoder having four inputs for receiving four respective data bits a0, a1, a2 and a3 of different 4-bit blocks of a value, three outputs for transmitting three respective decode bits q0, q1 and q2, and digital logic to generate the decode bits according to the logic equations $q0=\text{not}(a1+a2+a3+a4),$ $q1=\text{not}(a0+a1),$ $q2=a1(\text{not } a0)+\text{not}(a0+a2);$ a multiplexer stage that derives one or more outputs based on a portion of the decode bits; and
an output stage that combines the outputs from said multiplexer stage with decode bits to yield the number of non-significant zeros in the value.

13. The zero counter of claim 12 wherein each decode bit q0 is a most significant bit and each decode bit q2 is a least significant bit, and the decode bits of a given 4-bit block indicate the number of leading zeros in that block.

14. The zero counter of claim 12 wherein the digital logic includes:
inverters to create complementary bits a0_n, a1_n, a2_n, and a3_n;

a first NAND gate whose inputs receive data bits a0_n, a1_n, a2_n and a3_n, and whose output is the complement of decode bit q0;

a second NAND gate whose inputs receive data bits a0_n and a1_n, and whose output is the complement of decode bit q1;

a third NAND gate whose inputs receive data bits a0_n and a2_n;

a fourth NAND gate whose inputs receive data bits a0_n and a1; and a fifth NAND gate whose inputs receive outputs of said third and fourth NAND gates, and whose output is decode bit q2.

15. The zero counter of claim 12 wherein the digital logic includes:

inverters to create complementary bits a0_n and a2_n;

a first NOR gate whose inputs receive data bits a0 and a1, and whose output is decode bit q1;

a second NOR gate whose inputs receive data bits a2 and a3;

a first NAND gate whose inputs receive outputs of said first and second NOR gates, and whose output is the complement of decode bit q0;

a second NAND gate whose inputs receive data bits a0_n and a2_n;

a third NAND gate whose inputs receive data bits a0_n and a1; and a fourth NAND gate whose inputs receive outputs of said second and third NAND gates and whose output is data bit q2.

16. The zero counter of claim 12 wherein there are four 4-bit blocks and four 4-bit decoders whose decode bits are combined to yield the number of non-significant zeros in a 16-bit value.

17. The zero counter of claim 16 wherein said output stage uses a plurality of AOI21 gates to merge additional decode bits from a next lower 16-bit zero counter to enable a 32-bit zero counter.

18. The zero counter of claim 16 further comprising a fifth 4-bit decoder with the same digital logic which receives as inputs the most significant decode bit from each of the four 4-bit decoders, and outputs a q0 decode bit of one when all sixteen data bits from the 4-bit blocks are zero.

* * * * *